United States Patent [19]
Duchemin

[11] 3,734,482
[45] May 22, 1973

[54] DEVICE FOR FIXING A LEAF SPRING

[75] Inventor: Michel Duchemin, 59 Lambres les Douai, France

[73] Assignee: Ressorts Du Nord S.A., Douari, France

[22] Filed: Apr. 29, 1971

[21] Appl. No.: 138,698

[30] Foreign Application Priority Data
  Apr. 29, 1970 France..................................7015651

[52] U.S. Cl................................................267/52
[51] Int. Cl. ...................................................F16f 1/26
[58] Field of Search..........................................267/52

[56] References Cited
  UNITED STATES PATENTS
  1,517,134  11/1924  Wade....................................267/52
  3,437,333  4/1969  Koch et al..............................267/52

Primary Examiner—James B. Marbert
Attorney—Burns, Doane, Swecker & Mathis

[57] ABSTRACT

A device for fixing a leaf spring to an axle of a vehicle. The device comprises two clamping elements between which the spring is clamped by two U-shaped fixing members tightenable by nuts screwed thereon. One of the clamping elements is a resiliently-yieldable plate which has a bent shape in the free state so that it is applied against the spring throughout its surface area after the fixing members are tightened. In this way, the spring is prevented from bending in its center part (weakened by openings for assembly members) and wear, produced by rubbing along the ends of the clamping elements, is markedly reduced.

9 Claims, 3 Drawing Figures

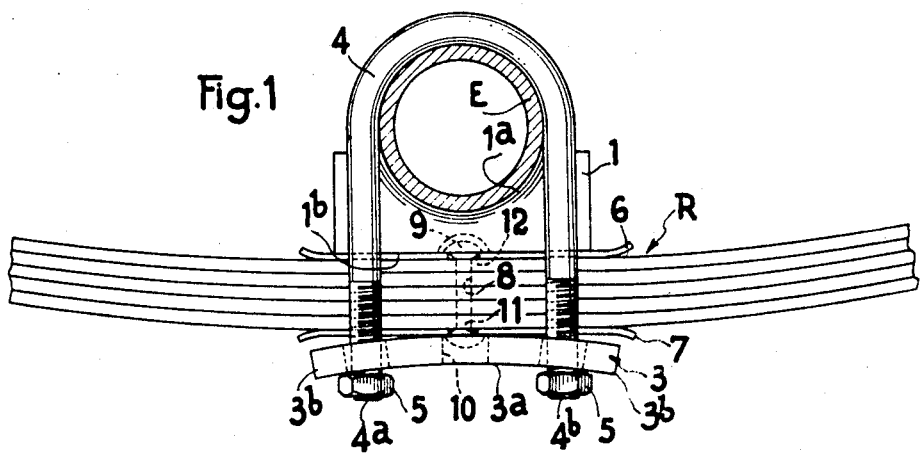
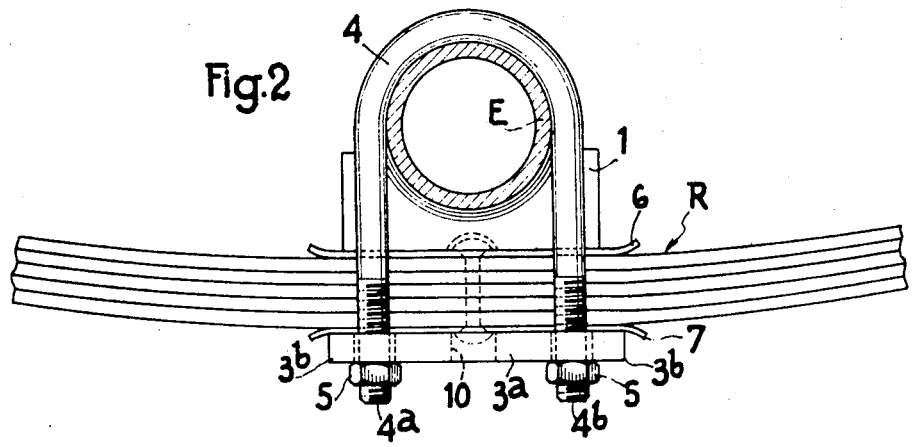
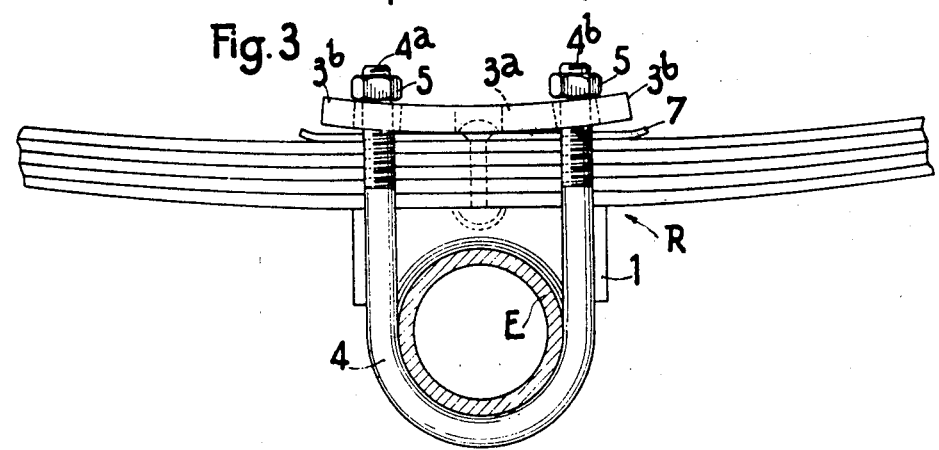

DEVICE FOR FIXING A LEAF SPRING

The present invention relates to devices for fixing leaf springs in particular to automobile or railway vehicle axles.

Usually, these springs are retained in their center part between two clamping elements one of which is rendered integral with the axle. These clamping elements have roughly plane faces in contact with the adjacent faces of the spring and are assembled by screwthreaded fixing means and nuts, these fixing means being preferably U-shaped members disposed on each side of the center part of the spring in the vicinity of the ends of the clamping elements. Now, the clamping elements are of necessity limited as concerns their thickness and weight and are not perfectly rigid so that the clamping force, obtained by tightening the nuts on the screwthreaded branches of the U-members, is transmitted to the spring in the immediate vicinity of these screwthreaded branches and is consequently applied on areas which are substantially less than the total area of the clamping elements. It is known, moreover, that the springs have in their median part connecting means, constituted for example by bolts or rivets, which extend through openings formed in the leaves and consequently weaken to a certain extent this part of the spring. The result of these two phenomena is that, notwithstanding the clamping force applied to the spring, the center part of the latter is subjected to stresses which are excessive considering the aforementioned weakening of the spring. Further, in the vicinity of the edges of the clamping elements the spring is subjected to variable bending stresses which produce small movements of elastic deformation and rubbing resulting in wear which is detrimental to the performance and resistance of the spring. This wear is the greater as the pressure is higher in the clamping zone.

Consequently, the object of the present invention is to remedy these various drawbacks and to provide a device for fixing leaf springs which permits avoiding both the excessive bending stresses in the center zone of the spring and wear or deterioration of the metal of the spring in the vicinity of the edges of the clamping elements.

The invention provides a device for fixing a leaf spring, for example to a vehicle axle, comprising two clamping elements disposed on each side of the spring, and fixing means interconnecting said clamping elements, wherein at least one of said clamping elements comprises a resiliently-yieldable metal plate which has a bent shape in the free state and a convex face facing the spring, said fixing means being in the vicinity of the ends of said plate so as to apply it throughout its surface area against the spring when said fixing means are tightened.

With this arrangement, the clamping pressure is distributed over a large area and no longer in the immediate vicinity of the fixing means so that the center part of the spring is suitably held and does not undergo excessive stresses.

According to another feature and in order to diminish wear and deterioration of the metal of the spring, there is interposed between said one of said clamping elements and said spring a layer of a material having lubricating properties. To this end, the clamping plate can be galvanized or there can be provided between the plate and spring a galvanized sheet, a sheet of zinc or like material, or a coating of paint containing powdered zinc.

Further features and advantages of the invention will be apparent from the ensuing description with reference to the accompanying drawing.

In the drawing:

FIG. 1 is a side elevational view, partly in section, of a first fixing device for fixing a leaf spring to a vehicle axle, before the device is tightened down;

FIG. 2 is a view similar to FIG. 1 after the device has been tightened down, and FIG. 3 is a view similar to FIG. 1 of a second arrangement according to the invention.

There will first be described, with reference to FIGS. 1 and 2, a device for fixing a leaf spring R to an axle E, the spring being disposed in this embodiment below the axle. The fixing device comprises a spring block 1 having on one face 1a a semi-cylindrical cavity 2 for receiving the axle and an opposite face 1b which is roughly plane and against which the spring bears. Also provided are a metal plate 3 composed of spring steel and two U-shaped members 4 or fixing means disposed on each side of the spring and having branches 4a, 4b which have screwthreaded end portions and receive tightening nuts 5. Disposed between, on one hand, the spring R and the block 1 and, on the other hand, the metal plate, are thin galvanized sheets 6, 7 adapted to protect the adjacent surface of the spring. The leaves constituting the spring R have in their center part aligned openings 8 for the passage of at least one connecting element such as a rivet 9. The plate 3 and sheets 6,7 have corresponding aligned openings 10, 11, 12. It will be observed that, in the free state (FIG. 1), the metal plate 3 has a curved shape, its center part 3a having a curvature which is larger than the parts in the vicinity of the ends 3b. It will be understood that when the nuts 5 are tightened, the ends 3b of the metal plate come into bearing relation to the adjacent face of the spring so that at the end of the tightening of the nuts, the plate is applied throughout its whole surface area against the spring (FIG. 2). Consequently, in contradistinction to what occurs in conventional fixing devices, the clamping force is transmitted to the spring over a large area and no longer only in the vicinity of the fixing means. Moreover, the center part of the plate 3 exerts on the spring a force of sufficient magnitude to prevent any bending of this part of the spring. This is particularly advantageous bearing in mind that the center zone of the spring is weakened by the openings 8 for the passage of the assembly rivets or bolts 9.

By way of example, it may be mentioned that, in order to obtain the desired shape, the profile of the metal plate can be constituted by a curve of the fourth degree and that the rise that a plate 125 mm long can have may be of the order of 4 mm.

The invention is of particular interest for springs having only a small number of leaves or thick leaves and springs having one or several leaves whose thickness decreases from the center to the ends. Indeed, these are the springs in respect of which the aforementioned phenomena of friction and wear are the most noticeable.

As concerns FIG. 3, in which similar reference characters denote similar elements in FIGS. 1 and 2, it merely shows a different assembly in which the spring is disposed below the axle instead of above the latter as in the first embodiment. Further, in this second embodiment, only a single galvanized sheet 7 is provided between the spring and the metal plate, since only this face of the spring is in fact subjected to a marked extent to the aforementioned phenomenon of wear.

As concerns this sheet 7, and as already mentioned, it may be advantageously replaced by a mere coating of powdered-zinc paint applied to the spring and/or to the adjacent face of the metal plate. Other like means can also be employed for precluding wear of the spring.

Having now described my invention what I claim and desire to secure by Letters Patent is:

1. A device for fixing a leaf spring to a structure, such as a vehicle axle, comprising two clamping elements disposed on opposite sides of said spring, and tightenable fixing means interconnecting said clamping elements, one of said clamping elements comprising a resiliently-yieldable metal plate which is subjected to bending stress due to the fact that it initially had a bent shape in the free state and a convex face facing said spring, said fixing means being combined with said plate in the vicinity of opposite ends of said plate so that said plate is applied throughout the surface area of said plate against said spring by said tightened fixing means.

2. A device as claimed in claim 1, comprising interposed between one of said clamping elements and said spring a layer of a material having lubricating properties.

3. A device as claimed in claim 1, comprising interposed between said clamping elements and said spring a layer of a material having lubricating properties.

4. A device as claimed in claim 1, wherein said metal plate has a center portion which has a curvature which is greater than the curvature of end portions of said plate.

5. A device as claimed in claim 4, wherein said curvature corresponds to a curve of the fourth degree.

6. A device as claimed in claim 2, wherein said layer is a galvanized sheet.

7. A device as claimed in claim 2, wherein said layer is a sheet of zinc.

8. A device as claimed in claim 2, wherein said layer is a coating of paint containing powdered zinc applied on a face of an element selected from said spring and said one of said clamping elements.

9. A device as claimed in claim 2, wherein said layer is a coating of paint containing powdered zinc applied on facing faces of said spring and said one of said clamping elements.

* * * * *